US009342528B2

(12) United States Patent
Clash et al.

(10) Patent No.: US 9,342,528 B2
(45) Date of Patent: May 17, 2016

(54) METHOD AND APPARATUS FOR TIERED STORAGE

(75) Inventors: Daniel Clash, Pittsburgh, PA (US); Michael L. Kazar, Pittsburgh, PA (US); John R. Boyles, Cranberry Township, PA (US); Jeffrey Butler, Sewickley, PA (US); Joseph Hosteny, IV, Pittsburgh, PA (US); Daniel S. Nydick, Wexford, PA (US)

(73) Assignee: Avere Systems, Inc., Pittsburgh, PA (US)

( * ) Notice: Subject to any disclaimer, the term of this patent is extended or adjusted under 35 U.S.C. 154(b) by 475 days.

(21) Appl. No.: 12/798,285

(22) Filed: Apr. 1, 2010

(65) Prior Publication Data

US 2011/0246491 A1 Oct. 6, 2011

(51) Int. Cl.
G06F 17/30 (2006.01)
(52) U.S. Cl.
CPC .................................. G06F 17/302 (2013.01)
(58) Field of Classification Search
CPC ............ G06F 11/1464; G06F 11/1469; G06F 17/30206; G06F 11/1451; G06F 12/0868; G06F 17/30067; G06F 17/30165; G06F 17/30194
USPC ................... 707/755, 828, E17.044
See application file for complete search history.

(56) References Cited

U.S. PATENT DOCUMENTS

| 8,059,940 | B2* | 11/2011 | Kakubashi | 386/324 |
|---|---|---|---|---|
| 8,214,404 | B2 | 7/2012 | Kazar | |
| 2002/0178271 | A1* | 11/2002 | Graham et al. | 709/229 |
| 2007/0124340 | A1* | 5/2007 | Chen et al. | 707/201 |
| 2007/0214497 | A1* | 9/2007 | Montgomery et al. | 726/4 |
| 2007/0283120 | A1* | 12/2007 | Fujita | G06F 3/0613 711/170 |
| 2008/0028164 | A1* | 1/2008 | Ikemoto et al. | 711/154 |
| 2008/0320097 | A1* | 12/2008 | Sawicki et al. | 709/216 |
| 2009/0125577 | A1* | 5/2009 | Kodama et al. | 709/201 |
| 2009/0310028 | A1* | 12/2009 | Sadri et al. | 348/718 |
| 2010/0094806 | A1* | 4/2010 | Apostolides et al. | 707/637 |
| 2010/0095064 | A1* | 4/2010 | Aviles | 711/118 |
| 2011/0246427 | A1* | 10/2011 | Modak et al. | 707/653 |

* cited by examiner

*Primary Examiner* — Scott A Waldron
*Assistant Examiner* — Soheila Davanlou
(74) *Attorney, Agent, or Firm* — Ansel M. Schwartz

(57) ABSTRACT

A system for storing file data and directory data received over a network includes a network interface in communication with the network which receives NAS requests containing data to be written to files from the network. The system includes a first type of storage. The system includes a second type of storage different from the first type of storage. The system includes a policy specification n which specifies a first portion of one or more files' data which is less than all of the files' data is stored in the first type of storage and a second portion of the data which is less than all of the data of the files is stored in the second type of store. The system comprises a processing unit which executes the policy and causes the first portion to be stored in the first type of storage and a second portion to be stored in the second type of storage. A method for storing file data and directory data received over a network.

32 Claims, 7 Drawing Sheets

METHOD AND APPARATUS FOR TIERED STORAGE

FIELD OF THE INVENTION

This invention is in the field of tiered computer storage servers—NAS or SAN servers with more than one type of persistent storage present in the system. The servers in question may be either NAS file servers or appliances that cache data from NAS file servers. (As used herein, references to the "present invention" or "invention" relate to exemplary embodiments and not necessarily to every embodiment encompassed by the appended claims.)

BACKGROUND OF THE INVENTION

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

Today, there are many types of persistent storage used by network attached storage servers, including magnetic disk storage, solid state storage, and battery-backed RAM. This type of storage can be used by a typical NAS or SAN server, storing all of the data in a virtual disk or file system, or it can be used in a tier or cache server that stores only the most recently accessed data form a disk or file system.

In either type of storage system, storing data in the best type of persistent storage for its reference pattern can result in a much better ratio of storage system cost per storage system operation. For example, NVRAM provides the fastest random read or write rates of the tree example storage media mentioned above, but it also currently the most expensive, perhaps five times as expensive as the next most expensive media (flash or solid state storage). Flash storage provides comparable random read performance to NVRAM at a small fraction of the cost, but getting good random write performance from flash storage is a challenge, and also negatively affects the overall lifetime of the flash device. Standard magnetic disk storage handles sequential read and write requests nearly as fast as any other persistent storage media, at the lowest cost of all, but loses the vast majority of its performance if the read or write requests are not for sequentially stored data.

Thus, if a storage system can place the various types of data in the appropriate type of storage, a storage system can deliver a much better price/performance ratio than one that simply uses a single type of persistent storage.

Existing systems make use of a mix of types of persistent storage in a number of ways. Many file servers, going back to Sun Microsystems' PrestoServe board for its SunOS-based file servers, have used NVRAM to reduce write latencies by providing temporary persistent storage for new incoming data. In the SSD arena, NetApp's PAM2 card is a victim cache made from SSD holding data that doesn't fit it memory, speeding up random reads to the data stored in the card. For a number of reasons, even thought this cache is made from persistent storage, the NetApp PAM2 cache does not hold modified data that is not persistently held elsewhere, either in an NVRAM card or on rotating disks. And of course, an obvious use of SSD drives 48 is as a replacement for existing drives, providing faster read access, especially random read access, at the cost of some penalty in both cost and write performance. Systems like ONTAP/GX can also make more intelligent use of flash or SSD drives 48 by migrating entire volumes to storage aggregates comprised entirely of SSD; in the ONTAP/GX case, this would allow portions of a namespace to be moved to SSD, although only in its entirety, only all at one time, and only at pre-defined volume boundaries.

It is in this context that this invention operates. This invention allows the mixing of SSD and normal rotating magnetic drives (hereafter referred to as hard disk drives, or HDDs) in the same file system, instead of as a cache or as a separate type of aggregate, and provides a number of policy mechanisms for controlling the exact placement of files within the collection of storage pools.

This provides a number of advances over the state of the art. First, because individual files can be split, at the block level, between SSD and HDD storage, or between other types of persistent storage, this server can place storage optimally at a very fine level of granularity. For example, consider the case of a media server where files are selected randomly for playing, but where, once selected, the entire file is typically read sequentially. This system could store the first megabyte or so in SSD, with the remainder of what may well be a 200 MB or larger file stored on much less expensive HDD. The latency for retrieving the first 1 MB of data would be very low because the data is stored in SSD, and by the time that this initial segment of data has been delivered to the NAS client, the HDD could be transferring data at its full rate, after having performed its high latency seek operation concurrent with the initial segment's transfer from SSD. To fully benefit from this flexibility in allocation, the storage system needs to apply allocation policies to determine where and when to allocate file space to differing types of storage. This invention allows policies to be provided globally, or for individual exports of either NAS or SAN data, or for arbitrarily specified subtrees in a NAS name space.

As compared with prior art that allows whole volumes to be relocated from HDD to SSD, or vice versa, this invention provides many benefits. First, the invention requires neither entire volumes nor even entire files to move between storage types, and second, data can be placed in its optimal location initially, based on the specified policies. As compared with using flash in a victim cache, use of flash memory as file system storage allows improvement in write operation performance, since data written never needs to be stored on HDD at all. In addition, this invention allows policies to change at any directory level, not just at volume boundaries.

BRIEF SUMMARY OF THE INVENTION

The present invention pertains to a system for storing file data and directory data received over a network. The system comprises a network interface in communication with the network which receives NAS requests containing data to be written to files from the network. The system comprises a first type of storage. The system comprises a second type of storage different from the first type of storage. The system comprises a policy specification which specifies a first portion of one or more files' data which is less than all of the files' data is stored in the first type of storage and a second portion of the data which is less than all of the data of the files is stored in the second type of store. The system comprises a processing unit which executes the policy and causes the first portion to be stored in the first type of storage and a second portion to be stored in the second type of storage.

The present invention pertains to a method for storing file data and directory data received over a network. The method comprises the steps of receiving NAS requests containing data to be written to files from the network at a network interface. There is the step of executing with a processing unit the policy specification which specifies a first portion of one or more files' data which is less than all of the files' data is stored in a first type of storage and a second portion of the data which is less than all of the data of the files stored in the second type of data which is different from the first type of storage. There is the step of causing with the processing unit the first portion to be stored in the first type of storage and the second portion to be stored in the second type of storage.

The present invention pertains to a system for storing file data and directory data received over a network. The system comprises a network interface in communication with the network which receives the NAS requests from the network, including the NAS requests containing data to be written to files. The system comprises a first type of storage. The system comprises a second type of storage different from the first type of storage. The system comprises a policy specification which specifies a first portion of one or more directories' data which is less than all of the directories' data is stored in the first type of storage and a second portion of the data which is less than all of the data of the directories is stored in the second type of store. The system comprises a processing unit which executes the policy and causes the first portion to be stored in the first type of storage and a second portion to be stored in the second type of storage.

BRIEF DESCRIPTION OF THE SEVERAL VIEWS OF THE DRAWING

In the accompanying drawings, the preferred embodiment of the invention and preferred methods of practicing the invention are illustrated in which.

DETAILED DESCRIPTION OF THE INVENTION

Figure 1:
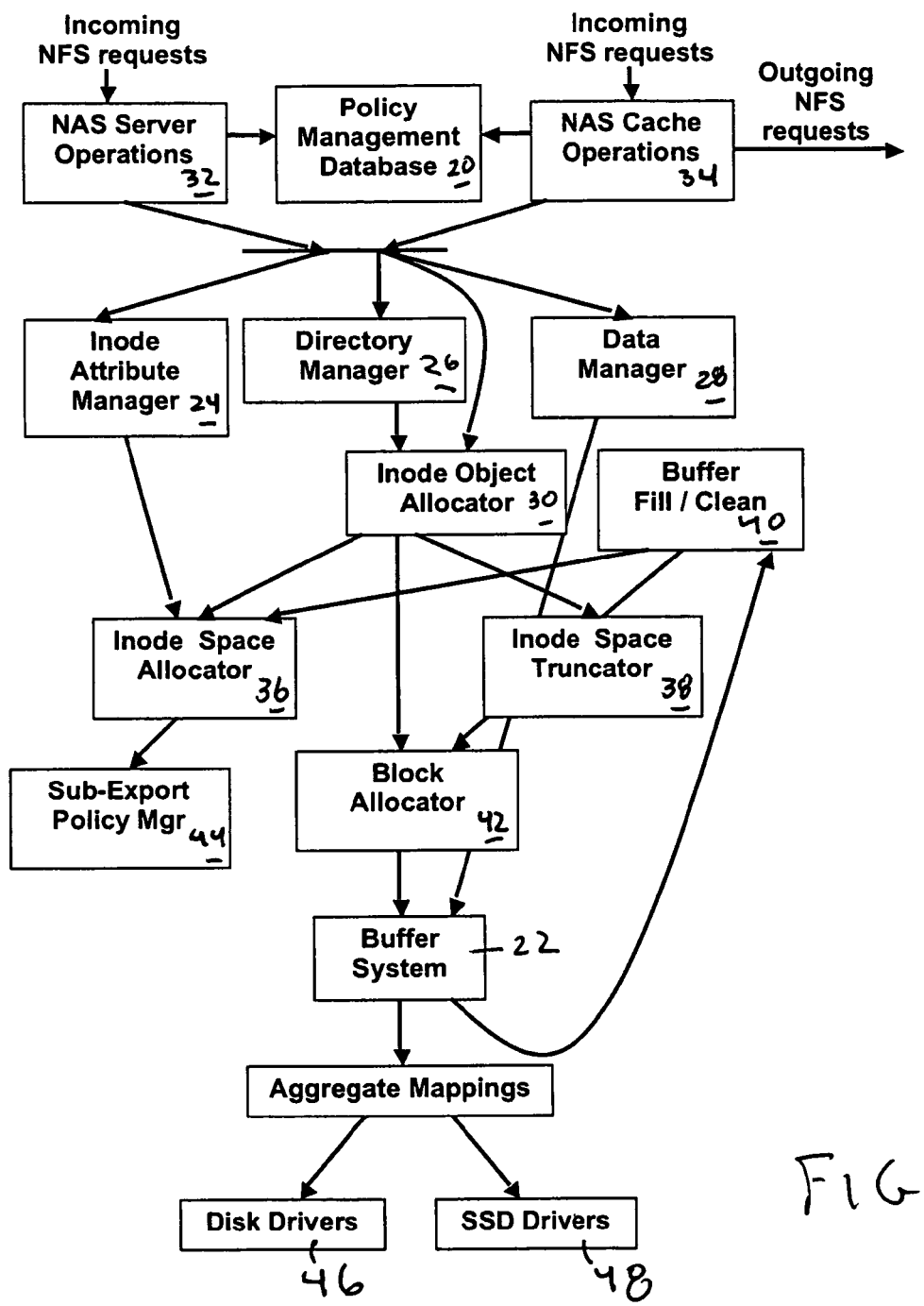
FIG. 1 is a block diagram of the system and of the claimed invention.
Figure 2:
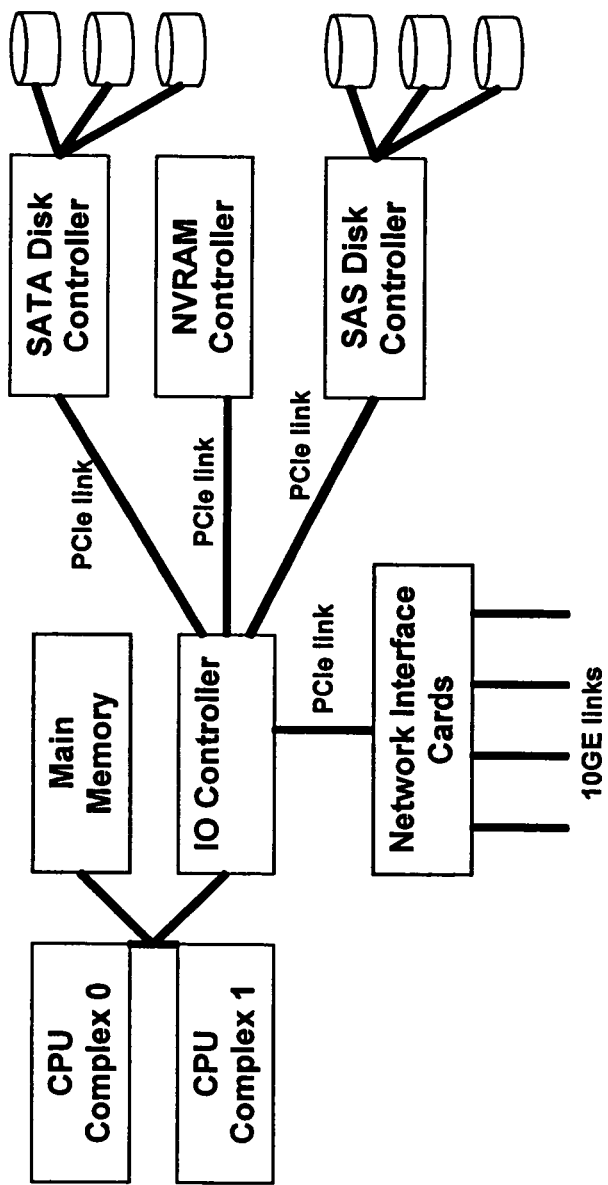
FIG. 2 is another block diagram of the system of the claimed invention.

Referring now to the drawings wherein like reference numerals refer to similar or identical parts throughout the several views, and more specifically to FIGS. 1 and 2 thereof, there is shown a system 10 for storing file data and directory data received over a network. The system 10 comprises a network interface 12 in communication with the network which receives NAS requests containing data to be written to files from the network. The system 10 comprises a first type of storage 14. The system 10 comprises a second type of storage 16 different from the first type of storage 14. The system 10 comprises a policy specification which specifies a first portion of one or more files' data which is less than all of the files' data is stored in the first type of storage 14 and a second portion of the data which is less than all of the data of the files is stored in the second type of store. The system 10 comprises a processing unit 18 which executes the policy and causes the first portion to be stored in the first type of storage 14 and a second portion to be stored in the second type of storage 16.

At least two files may be stored within a directory, where a Block Allocator 42 allocates some blocks to a first file in the directory from a first type of storage 14, and allocates some blocks to a second file in the directory from a second type of storage 16 different from the first type of storage 14. The system 10 may include a Block Allocator 42 that allocates blocks for a file from a first type of storage 14 and additional blocks for the same file from a second type of storage 16 different from the first type of storage 14. The Block Allocator 42 may determine the blocks to be allocated to a file from a first type of storage 14, and the blocks to be allocated from a second type of storage 16 different from the first type of storage 14, based upon the policy associated with the file.

Some examples of different types of storage that includes drives made from different materials, or drives that use different formats or structure, or drives that operate at least at a 10% difference in speed or drives that have at least a 10% difference in bandwidth and/or average latency performing random read operations. Or, there could be "solid state disks" vs. "fibre channel disks" (that is, disk drives made from flash chips vs. disk drives made from magnetic media disks); the flash disks have much lower latency when doing random IO operations. In general, different types of storage might have different access latencies (the time between sending a request and receiving the desired data) and different transfer rates. Disk drives can rotate at rates between 5400 RPM and 15000 RPM, with access times inversely proportional to the rotation speed (one basically has to wait ½ of a spin to obtain the desired data, on average).

The policy specification may be stored in a file within the first type of storage 14 or the second type of storage 16. The system 10 may include a management database 20 outside of the first type of storage 14 or the second type of storage 16 where the policy specification is stored in the management database 20.

The policy specification may specify the first portion and the second portion of one or more files' data, where either portion may include file system 10 meta-data. The policy specification for the first portion or the second portion of one or more files' data may include meta-data containing block addressing information.

The system 10 may include a buffer module 22 having buffers and which reads and writes data into the buffers. The system 10 may include an inode attribute manager 24 which updates attributes in an inode. The system 10 can include a directory manager 26 which treats a directory object as a set of mappings between file names and inode identifiers. Alternatively, the system 10 may include a data manager 28 which copies data to and from the buffers. The system 10 may include an inode object allocator 30 which allocates inodes and tags them with policy specifications.

The system 10 may include a NAS server operations module 32 which receives incoming NAS requests and invokes local storage operations interfacing with the inode attribute manager 24, the directory manager 26, the data manager 28 and the inode object allocator 30 for reading and writing file and directory attributes, reading and writing file data, and performing directory operations. Alternatively, the system 10 may include a NAS cache operations module 34 which acts as a cache of data storage in one or external NFS servers and which creates and maintains cached versions of actively accessed directories and files stored at the external NFS server.

The present invention pertains to a method for storing file data and directory data received over a network. The method comprises the steps of receiving NAS requests containing data to be written to files from the network at a network interface 12. There is the step of executing with a processing unit 18 the policy specification which specifies a first portion of one or more files' data which is less than all of the files' data is stored in a first type of storage 14 and a second portion of the data which is less than all of the data of the files stored in the second type of data which is different from the first type of storage 14. There is the step of causing with the processing unit 18 the first portion to be stored in the first type of storage 14 and the second portion to be stored in the second type of storage 16.

There may be the step of writing data to a file located in a directory which is a policy root directory and has the policy specification. There may be the steps of looking up a subdirectory D, which is a policy root directory having an associated policy specification, and associating the policy specification with subdirectory D. There may be the step of looking up a subdirectory D of a parent directory having an associated policy specification, and associating the parent directory's policy specification with subdirectory D. There may be the step of looking up a file within a directory having an associated policy specification, and associating the directory's policy specification with file F. There may be the step of writing data to a file F located in a directory having an associated policy specification, and the step of the Inode space allocator 36 allocating space to hold the written data according to the associated policy specification.

The looking up directory D step may include the steps of consulting a cache of a management database 20, determining that the directory D is a policy root, and augmenting directory D's file handle with a policy tag indicating a policy to be applied to files under directory D in the file system's 10 namespace. There may be the step of looking up a subdirectory D of a parent directory having an associated policy specification, and associating the parent directory's policy specification with subdirectory D. There may be the step of looking up a file within a directory having an associated policy specification, and associating the directory's policy specification with file F. There may be the steps of receiving the lookup for file F within directory D, and propagating the policy tag from directory D's file handle to file F's file handle. There may be the step of storing the data in buffers of a memory until a buf clean module collects modified data to write the modified data to persistent storage; determining with the buf clean module which portions of the file F have new data; and calling from the buf clean module into an inode space allocator 36 to ensure that blocks have been allocated in persistent storage for an appropriate block range in the file F. There may be the step of identifying with the inode space allocator 36 a policy associated with the file F from the policy tag of file F's file handle; calling a block allocator 42 module with the inode space allocator 36; obtaining with the block allocator 42 module storage blocks of an appropriate type in persistent storage; and inserting with the inode space allocator 36 block addresses associated with the appropriate storage into an indirect block tree associated with a file F. There may be the step of starting JO operations with the buf clean module from buffers in memory having respective data written to the appropriate storage blocks in persistent storage.

The present invention pertains to a system 10 for storing file data and directory data received over a network. The system 10 comprises a network interface 12 in communication with the network which receives the NAS requests from the network, including the NAS requests containing data to be written to files. The system 10 comprises a first type of storage 14. The system 10 comprises a second type of storage 16 different from the first type of storage 14. The system 10 comprises a policy specification which specifies a first portion of one or more directories' data which is less than all of the directories' data is stored in the first type of storage 14 and a second portion of the data which is less than all of the data of the directories is stored in the second type of store. The system 10 comprises a processing unit 18 which executes the policy and causes the first portion to be stored in the first type of storage 14 and a second portion to be stored in the second type of storage 16.

In the operation of the invention, a technique is provided to declare policies used for placing data in one of several types of persistent storage holding a file system 10. The system 10 provides one or both of a NAS server, or a NAS cache server. A NAS server exports NFS, CIFS or other network file system 10 protocol access to one or more file systems. A NAS cache server provides the same protocol access to data stored on an external NAS system, while maintaining a cache of frequently accessed files and directories within the cache server. This invention is a continuation of <<vseg patent>>, which describes a file system 10 that can store any block of data in one of a plurality of types of storage, and of <<cache patent>>, which describes a cache server appliance that can cache data from one or more external NAS file servers.

In this invention, data is exported via one of two mechanisms, either a NAS Server, or a NAS Cache. Each NAS file system 10 exported from this invention is exported either from the NAS server operations module 32, or the NAS cache operations module 34, but not both for a given NAS export.

Both a NAS Server and a NAS Cache provide a set of exports, each of which is a root of a file system 10 tree. In this invention, the administrator can associate a set of data policy rules with a server export, such that the policy rules are applied to any object allocated within the export's subtree. Additionally, for data exported via the NAS Server Operations, the policy rules can be changed at any directory, by creating a file called ".avere_control" in the directory, and placing within the file a description of the policy to be applied for that directory, and to all of its descendents. For data exported via the NAS Cache Operations, .avere_control files containing policy rules can be placed at locations in the file system 10 called sub-export roots; however, any directory can be made into a sub-export root directory.

These policies can specify to which type of storage data for an affected file should be allocated. It should be clear that other types of policies beyond allocation policies can be specified with this mechanism. For example; priority information could be associated with the policies, as well.

The base system 10 provides a number of pre-defined policies, including a policy that places all data in HDD storage, another policy that places all data in SSD storage, and a policy that places the first N bytes of a file in one type of storage, and the remainder in another type of storage (typically, these would be SSD and HDD, respectively).

Structurally, the system 10 is described as follows:

In FIG. 1, all of the software modules are executed by one or more general purpose processors in a computer system 10, with attached Network Interface Cards (NIC cards), attached main memory accessible to all processors. The computer system 10 includes an NVRAM card attached to an IO bus (typically PCI Express today), and as described below, some modules cause data to be transferred over the PCI Express bus from the computer system 10's main memory to the NVRAM card to protect said data from loss in the event of a system crash or power loss. Storage devices are attached to the computer system 10 via one or more storage controllers on a PCI Express bus. These controllers attach to magnetic or solid-state disk drives over either a Serial-attached SCSI (SAS) or Serial-attached ATA (SATA) bus.

FIG. 2 shows the hardware components of the system 10 mentioned below. One or more CPU complexes are connected via internal buses to both main memory and an JO controller, which provides a number of PCI Express (PCIe) links. One or more of these PCIe links connects to Network Interface Cards, which send and receive network traffic. One or more of these PCIe links connects to a SATA disk controller, which in turn connects to one or more SATA disk drives over SATA links. One or more of these PCIe links connects to a SAS controller which connects to one or more disk drives over SAS links. One or more of these PCIe links connects to an NVRAM controller card, which holds a copy of some data before it is written to persistent disk storage.

Unless otherwise noted below, all of the modules in FIG. 1 execute on one or more of the processor complex, and may access any of the other components shown in FIG. 2.

In this system 10, NFS and other NAS protocols are processed by the NAS Server Operations or the NAS Cache Operations boxes in FIG. 1, processing requests received by one or more Network Interface Cards (NICs) in a computer system 10. The NAS server operations module 32 invokes local storage operations providing an interface for reading and writing file and directory attributes, reading and writing file data, and performing directory operations. The NAS Cache Operations provide similar functionality, but acting as a cache of data stored at one or more external NFS servers, where the cache operations module creates and maintains cached versions of the actively accessed directories and files stored at the external NFS server. Both of these modules execute on general purpose processors in the computer system 10.

In this document, an inode represents either a file system 10 object that represents a file, directory or symbolic link. In the case of data accessed by the NAS Server Operations (NSO), there is one such object for each file, directory or symbolic link in the file system 10. In the case of data accessed by the NAS Cache Operations (NCO), there is one such inode for each file from the back-end file server that is currently cached in the server.

The Buffer module 22 is used by both the NSO and NCO modules to read and write file system 10 data. The module tags fixed sized buffers, stored in the processor's main memory, with an inode object pointer, qualified by a byte offset within that inode. One distinguished inode represents the data in the collection of physical disks holding a file system 10, while others represent individual files, directories or symbolic links. The Buffer module 22 also keeps track of which ranges of bytes within each buffer need to be copied to a separate NVRAM card on the computer system's PCI Express bus. This copy is initiated from main memory to the NVRAM card's memory over the PCI Express bus by the Buffer package when a buffer's last write reference is released.

All types of inodes have filling methods and cleaning methods in the module named "Buffer Fill/Clean"; these methods are responsible for filling a buffer with data stored in persistent storage when the buffer is first accessed, and for writing updates to persistent storage sometime after the buffer has been modified, respectively. These methods cause data to be transferred over a PCI or PCI Express bus from disk or SSD drives 48 attached to a SAS or SATA bus, in the preferred embodiment. However, it should be clear to someone skilled in the art that other processor JO buses than PCI or PCI Express can be used, and other storage attachment buses than SAS or SATA can be used, as well.

The Inode attribute manager 24 is responsible for updating attributes in a given inode. These attributes include file access, change and modification times, file length and ownership and security information. This module is typically implemented by the main processor, acting on memory managed by the aforementioned Buffer module 22.

The Directory manager 26 treats a directory object as a set of mappings between file names and inode identifiers. It can create entries, remove entries, and enumerate entries in a directory. It executes on the main system 10 processors.

The Data manager 28 is responsible for copying data to and from buffers provided by the Buffer module 22, as part of handling read and write NAS requests.

The Inode object allocator 30 is responsible for allocating and tagging inodes in the local file system 10. These inodes may be tagged by any arbitrary string of bytes, so that the same mechanism can be used by either the NSO or NCO modules. This module is also responsible for deleting files, and pruning files from the cache when space gets low and an NCO is operating.

The Inode space allocator 36 module is responsible for adding disk blocks to existing inodes.

The Inode space truncator 38 is responsible for freeing disk blocks referenced by existing inodes. The resulting blocks will then read as zeroes after the truncator has completed.

The Block allocator 42 is responsible for allocating blocks of persistent storage for the Inode space allocator 36, and for freeing blocks of persistent storage for the Inode space truncator 38. The blocks whose allocation status is tracked by this module are stored in the disk drives shown in FIG. 2.

The sub-export policy manager 44 is responsible for mapping incoming file handles tagged with a sub-export tag to the specific policy associated with that sub-export. Sub-exports are one mechanism used to associate a specific policy with an arbitrary directory, and are the only mechanism that can be used to associate a policy with an arbitrary directory exported via the NAS cache operations module 34.

The disk driver module 46 actually performs IO operations to HDD and SSD drives 48, and any other types of persistent storage present in the system 10.

There are two mechanisms for determining the policy to apply to a particular file, one typically used in NSO subtrees, and one which is typically used within NCO subtrees. The NSO subtree policy mechanism has the benefit of requiring less information in the file handles returned to the NAS client, but does not work in NCO subtrees. The NCO subtree policy mechanism works actually works in both types of subtrees, and is the only one that works reliably in NCO subtrees. In the preferred implementation of the invention, the NSO mechanism is used in any NSO subtrees, and the NCO mechanism is used in any NCO subtrees, but other implementations might use the NCO mechanism for both types of subtrees.

Within NSO subtrees, each inode has a policy object, and this object is inherited from its parent directory at the time the object is created or found from a directory search. That is, an NSO directory lookup operations copy a pointer to the parent directory inode's policy object into the newly located child's inode, and a vdisk create operation does the same thing, initializing the newly created object's inode's policy object to that of the parent directory's inode.

Within NCO subtrees, each inode has a sub-export ID, which is inherited from its parent directory at the time the object is created or found from a directory search. That is, an NCO directory lookup operation copies the sub-export ID from the parent directory inode's sub-export ID, and an NCO create operation does the same thing, initializing the newly created object's inode's sub-export ID to the value associated with the parent directory's inode. If the looked-up object is the root of a sub-export tree, on the other hand, the new sub-export's ID is used instead of the inherited ID. Given a sub-export ID, the sub-export manager can locate the current policy object for that sub-export ID, through a simple table lookup. Thus, with NCO operations as well, the invention can obtain a policy object from any inode, typically inherited from the policy object in use by the object's parent directory.

A global policy object can be provided to define the behavior of the system 10 in the absence of any overriding policy control file, as well.

When a policy object is updated, the new policies will be directly utilized by cleaning operations for each inode sharing the policy automatically.

More complex is the situation in an NSO tree where a new policy object is placed upon a directory that does not already contain a policy control file, but which inherited a policy from an ancestor's control file, and which also has a number of descendents already using that ancestor's control file. In this case, simply changing the policy object on the inode whose directory was just assigned a new policy control file will not automatically update the policy references in any of that directory's descendents. To handle this situation, a "path verifier" is associated with version number with each policy object, and labels each inode with the policy object's last path verifier. When a new policy is inserted into a directory tree by creating or deleting a policy control file, the policy of the parent directory (in the case of the create) or the policy being deleted (in the case of the deletion of a policy control file) has its version incremented. When a policy object is encountered whose path verifier does not match the path verifier cached in the referencing inode, the system 10 walks up the directory path, following each directory's " . . . " entry in turn, until a directory with a path verifier matching its policy object is encountered. This policy object is then stamped into the referencing inode, along with its current path verifier. This algorithm requires that each non-directory file system 10 object, that is, regular files and symbolic links, also store a reference to the object's parent directory. The details of how this is done are provided below, but the fundamental idea is to store up to two back pointers from each inode to parent directory entries, and to store an additional exception table for those files that have more than two parent links, a fairly rare occurrence. Directory " . . . " entries are not counted in the hard link table of the parent directory.

Recall that the continued invention provides an aggregate abstraction containing data segments consisting of moderate sized arrays of storage blocks comprised of the same type of persistent storage (within each segment). Given a representation of the policy to be applied to allocating any given inode's data, this information is used by the cleaner to control what type of segment will supply blocks for newly written data. Thus, for example, if a policy specifies that the first megabyte of a file should be allocated from solid state disks (SSDs), and a cleaner is cleaning some blocks in the range of 262144-278528, the cleaner will allocate the blocks for this data from a segment allocated from SSD.

Note that while the preferred realization of this invention includes both a NAS cache operations module 34 and a NAS server operations module 32, other combinations are possible. For example, a system 10 providing NAS Cache Operations alone would be a useful caching appliance. A system 10 providing a NAS server operations module 32 alone would be a useful file server.

In describing the present invention, reference is first made to a file system 10 as described in U.S. patent application Ser. No. 12/283,961, incorporated by reference herein.

That invention provided a file system 10 in which data is stored in multiple segments, each segment being comprised of a different type of persistent storage, for example, flash storage, expensive FC disk drives, inexpensive SATA disk drives, and/or battery backed RAM. In that system 10, individual blocks, including both data and meta-data blocks associated with a file can be allocated from separate segments.

This invention extends U.S. patent application Ser. No. 12/283,961, incorporated by reference herein, by providing a rich variety of policies for determining from which segment a particular block allocation should be performed, and allowing different policies to apply to different portions of the file system 10 name space. In addition, this invention extends the first invention to include file system 10 cache appliances.

Below, a policy language is described that allows the specification of how data and meta data blocks should be allocated for affected files. Then, the detailed implementation of the storage system 10 is described, including a description of the mechanisms for providing a global default policy, a default policy for each exported file system 10, and a mechanism for overriding these two default policies on a per-directory or per-file basis.

Policy Specifications

A policy specification based on a Lisp-like syntax is provided. In particular, the definition of a function named "allocType" is allowed that is called with two parameters, the attributes of the inode being cleaned, and the offset at which a particular block is located within the file. The function returns the atom "ssd" if the data should be located in SSD storage, and returns the atom "hdd" if the data should be located in HDD storage. The attributes provided include, but are not limited to:

length—the file's length in bytes extension—the last component of the file name, for example "mp3" for a file named "music.mp3"

type—one of "directory", "file" or "symlink".

mode—the Unix protection bits (defun allocType (attrs offset) (return "flash"))

or (defun alloc-type (attrs offset) (if (or (less-than offset 0x400000) (eq attrs.type "dir"))) (return "flash") (return "hdd")))

or (defun alloc-type (attrs offset) (if (equal attrs.type "directory") (return "flash") (return "hdd"))

or (defun alloc-type (attrs offset) (if (greater-eq attrs.size 100000) (return "hdd") (return "flash")))

The usual comparison and Boolean operators of "eq" "not-eq" "less-than" "greater-than" "less-eq" "greater-eq" "not" "and" and "or" are provided. Arithmetic operators "add" "subtract" "times" "divide" are also provided on integers. Strings can be compared for equality only, while integers can be compared with any of the comparison operators.

Storage Format

Figure 3:
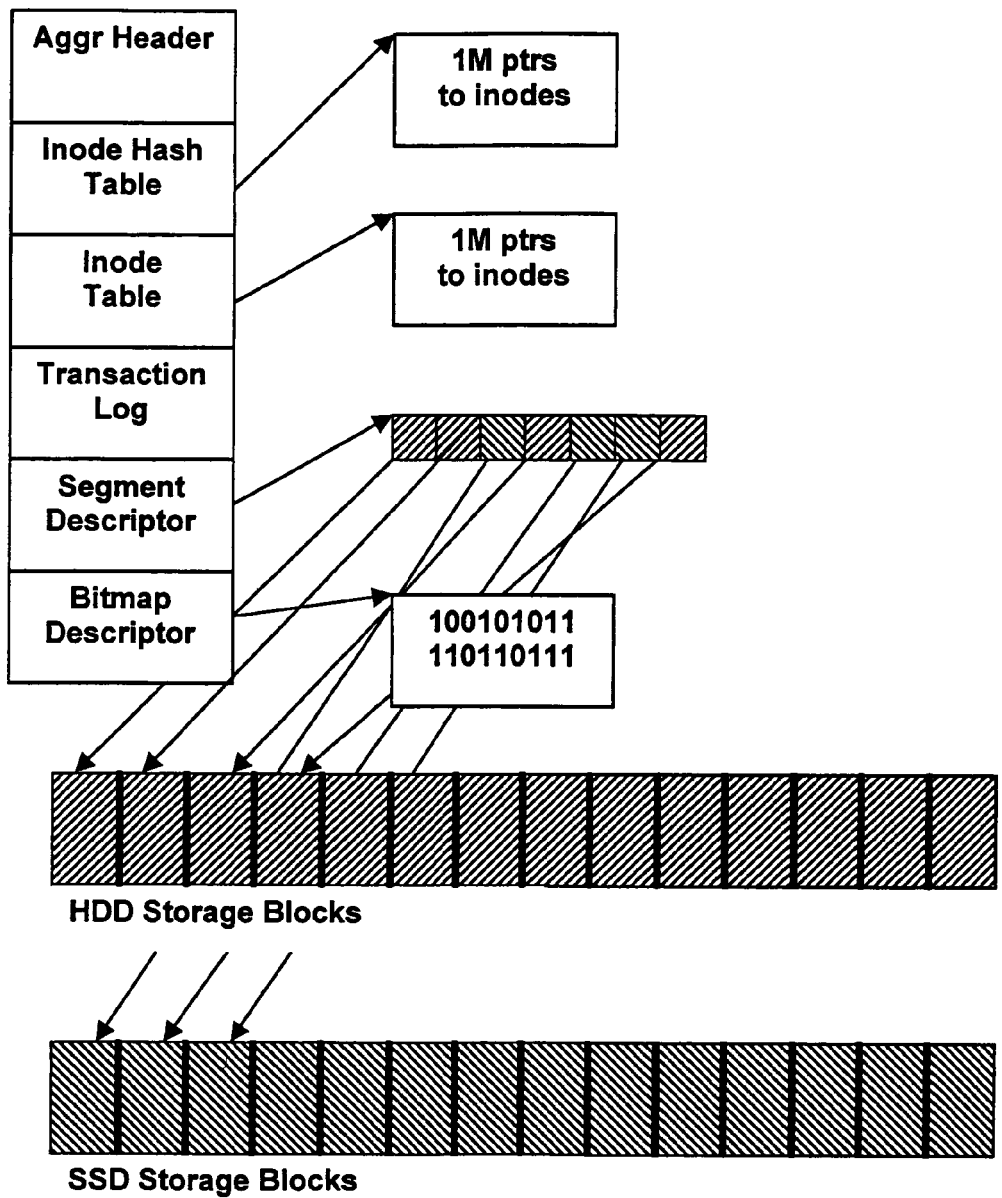
FIG. 3 shows an inode table file.

The storage in this invention is divided into different classes, based on the type of the underlying persistent media. The storage in this invention is organized as an aggregate, providing an array of persistent storage blocks of different types; this organization is shown in FIG. 3. The blocks of each type of storage are grouped into contiguous sets of fixed sized segments. For each segment in the aggregate's block address space, the file system 10 has a 16 bit segment descriptor giving the type of persistent storage backing that portion of the address space. For example, an aggregate might have a 16 KB block size, and a segment size of 1 GB, holding a contiguous collection of 65536 blocks. The segment descriptor corresponding to a particular segment gives two pieces of information, a bit indicating whether there are any free blocks within this segment, and 15 bits describing the type of storage underlying this segment.

The aggregate also stores a bitmap array, providing one bit per block in the aggregate, where a value of 1 means the corresponding block is allocated, while a value of 0 means that the block is free and available for use.

When a particular block of a particular type of storage needs to be allocated, the system 10 effectively searches for a segment descriptor indicating both that the segment is not full, and that the segment consists of the desired type of persistent storage. A block is then allocated from that segment by consulting the allocation bitmap for the segment in question, returning the desired number of blocks and setting the corresponding bitmap bits. If the segment is full, the segment descriptor is also modified to indicate that the segment is full.

When freeing a block, the corresponding bit is simply cleared in the allocation bitmap, and overwrites the segment descriptor for the segment containing the freed block to indicate that the segment is not full.

Inodes provide the key file abstraction used in this invention: they provide a way to organize a subset of the storage into a contiguous range of file blocks that can be read or written as a contiguous set of data blocks. An inode is a small (256-512 byte) structure describing the location of the data blocks making up a file. This abstraction is used to store the bitmap array, the segment descriptor array, the inode hash table and the inode table itself. Note that these key inodes are stored in the aggregate header itself, rather than in the inode file.

With the exception of the meta data files described in the paragraph above, the inodes of all of the files in the system 10 are stored inode table file. Each inode is tagged by a file handle, a variable length string uniquely identifying the file. The inode can also be named by its address within the inode file itself in certain contexts, usually that of internal pointers in the file system 10 itself.

Figure 4:
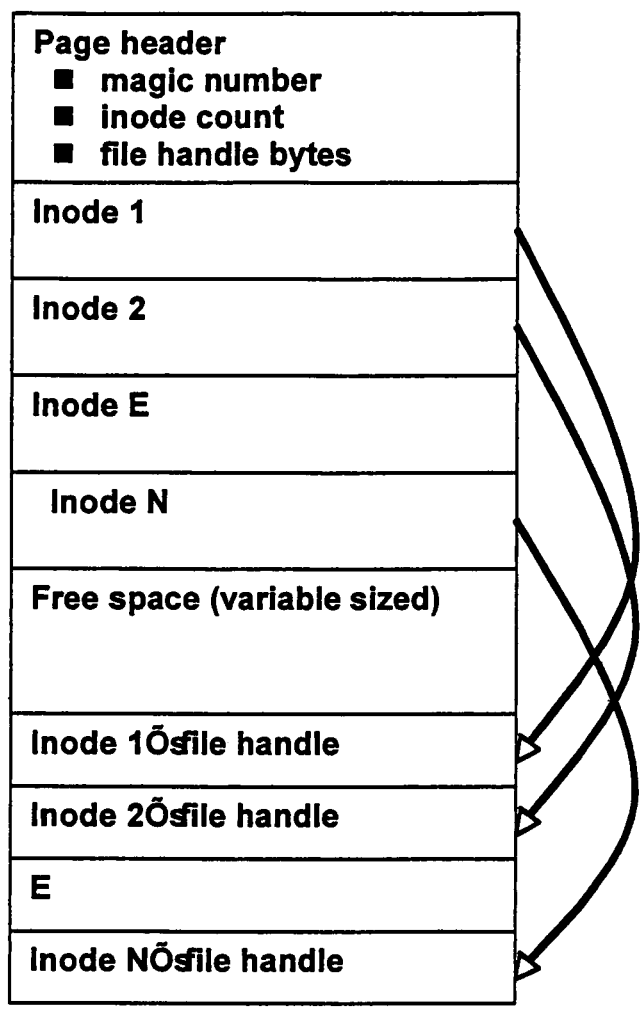
FIG. 4 shows the contents of an inode file slotted page.

The inode table file consists of an array of slotted pages, with a header at the start of the page specifying how many inodes are in the file, and specifying how many bytes of file handle are stored at the end of the slotted page. After the header, there is an array of inodes, then some free space, and finally the set of file handles associated with the inodes in this slotted page. The set of file handles is stored at the end of the slotted page, and is allocated from back to front. FIG. 4 shows the contents of an inode file slotted page.

The system 10 typically locates an inode either by its offset within the inode table file, or by its file handle. Finding an inode by offset within the inode table file is very simple: since inodes do not span block boundaries, the system 10 simply requests the buffer containing the desired inode offset, and locates the inode at the appropriate offset within the block. In order to find an inode by file handle, the file handle is hashed into a 32 bit value, which is then computed modulo the inode hash table size. The inode hash table file is then consulted; this file is treated as an array of 8 byte offsets into the inode table file, giving the offset of the first inode in that hash conflict chain. The inode file is then searched, loading one slotted page at a time, until an inode with the correct file handle is located, if any.

If an inode needs to be created with a particular file handle, then after the search is complete, if no inode has been located with the desired file handle, a new inode is allocated.

The header in the inode table file has a list of all slotted blocks that have room for at least one more inode. This list is consulted, and the block at the head of the list with room for another inode is read into the buffer package, and the new inode is created in that block. If no existing blocks have room for another inode, a collection of new blocks are allocated to the inode file by the inode space allocator 36, and the new inode is allocated from one of these blocks.

Operation Overviews

The following paragraphs give a description of the invention, describing how each of the core modules described in FIG. 1 operate.

NAS Server Operations

The NAS Server Operations (NSO) module receives incoming NAS calls, in this case, NFS operations, and executes them by making calls on the Inode attribute manager 24, the Directory manager 26, the Data manager 28 and the Inode object allocator 30.

The following describes how each operation is performed, in detail.

NSO File Create

When a file, symbolic link, or directory is created, an inode is allocated using the inode allocator, which uses a simple linked list implementation to find a free block of space to hold a new inode. One of the fields in this inode is a pointer back to the directory in which the file name is being created, and this field is initialized at this time with the inode address of the parent directory's inode. This address is represented as the byte offset of the inode within the Inode Table file.

At this time, the policy pointer is also set in the newly created file. The policy object is inherited from the parent directory, as follows. First, the policy object named by the parent directory is referenced, and the create operation compares the referenced policy object's version number with the policy version number in the parent directory inode itself. If they match, this policy object reference (represented as the inode address of the file storing the policy description), and the corresponding version number are stored in the newly created file. If the two versions do not match, the policy path procedure is performed to locate the current policy object for the parent directory, and then store the newly determined policy object address and policy version number in the newly created file's inode.

If the operation is a symbolic link or directory, the first data block of the newly created file is initialized as well, by simply updating the buffer cache block tagged with the newly created inode and offset 0 within the inode, filling it with the initial contents of the symbolic link, or the header of an empty directory, respectively.

NSO File Delete

When a file, directory, or symbolic link is deleted, first the operation is validated (the type of the operation matches the type of the object, and for directories, that the directory is empty). Once validated, a delete operation then checks whether the object has a link count of 1, or greater than 1. If the object has a high link count, then delete will only remove the reference to the object; the object itself is left untouched except for decrementing its link count. To maintain the parent pointers from the inode, the reference to the parent directory is removed from the set of back pointers from the deleted inode. The parent directory's contents are also modified to remove the entry pointing to the deleted file; this results in one or more modified blocks in the buffer cache that will eventually be written out by the Buffer Cleaner to the directory's inode.

If the last link to an object is removed with delete, then in addition from removing the parent link from the object, the file system 10 operation invokes the truncate operation by calling the inode space truncator 38 to free the SSD or HDD blocks allocated to the file back to the pool of free disk blocks for the aggregate. Note that each block is allocated from a particular type of storage, and is freed back to the same type of storage.

If the object deleted is policy file, the delete operation increments the policy inode's version number, forcing all objects that were using the policy object to perform the policy path procedure to determine the new correct policy to utilize.

If the link count on the deleted object is still greater than zero, the file still exists on another path. In this case, the policy path procedure is performed on the file to verify that there is a valid policy associated with the unlinked file.

NSO File Rename

File rename is essentially a combination operation that is equivalent of a delete of the target of the rename, a hard link from the source object to the target name, and a delete of the source object (which simply removes the name from the directory and updates the back pointer from the source object's inode, since the source object would have a link count>1 in a rename operation).

If a file rename occurs within a single directory, no policy path updates are required. If a normal file is renamed between two directories, the path policy procedure is performed on this file alone to regenerate its policy pointer. If a directory is renamed between two other directories, the policy version number of the policy associated with the renamed directory is incremented, which will force the policy path procedure to be performed for all of the children of the renamed directory; this increment need not occur if this policy is stored in the directory being renamed itself.

NSO File Truncate

A file truncate simply invokes the inode space truncator 38 module to remove all of the disk blocks allocated to the file's inode, and then updates the disk buffer that holds stores the inode itself, setting the new file's length in the inode. Note that the allocation policy has no effect on the truncate operation, since the system 10 is only freeing already allocated blocks, and of course those blocks have to be freed to their original storage.

NSO File Link

A file link operation simply adds a new reference from a new directory entry to an existing file or symbolic link's inode. The operation adds a new entry to the target directory, increments the link count on the target inode, and adds a back pointer to the target inode's back pointer list. The back pointer information is the storage address of the directory's inode. This back pointer is used by the policy path procedure to find the appropriate policy to use for allocating space for the file.

Adding a file link does not change the default policy in use by the linked file.

NSO File Read

A file read operation operates very simply: the buffers tagged with the target file's inode and the required offsets to cover the range being read are loaded into memory, and then transferred over the network to the client making the request.

NSO File Write

A file write operation operates simply: the buffers tagged with the target file's inode and the required offsets to cover the range being written are loaded into memory, and then filled with data received over the network from the client sending the request. Any buffers that are overwritten in their entirety do not have to be filled from HDD/SSD, but can be created empty.

The updated buffers are marked as dirty, and will be cleaned eventually by a buffer clean operation, as described below.

Note that dirty buffers modified by this Write operation are transferred to the NVRAM card, shown in FIG. 2, where they remain until the buffer clean operation transfers the data to disk storage, at which point the NVRAM buffers can be freed.

NAS Cache Operations

The NAS Cache Operations function as a continuation of <<Avere cache patent>>. These operations are described in detail in that invention disclosure, and typically modify the file system 10 state by reading and writing attributes, directory contents, and file data, in response to incoming NFS operations, and responses from calls made to the NFS backend server whose contents are being cached.

The NAS cache operations module 34 provides the same external interface as the NSO module, although the implementation is significantly different (and described in detail in the aforementioned cache patent). However, because this module implements a cache, files may be discarded from the cache at various times, changing the algorithms that must be used to track the policy in use by any given file. To a lesser degree, the algorithms for determining the storage pools from which to allocate storage also change. These changes from <<the cache invention>> are described in detail below.

In this module, instead of storing policy pointers directly in inode, the invention stores sub-, export IDs in each inode and uses the Sub-Export manager to map these IDs into policies as the inodes are actually used by NAS Cache Operations. This is done because the system 10 has no way to in general determine the parent object of a file if the file is no longer in the cache, with the result that there may be no way to determine the current policy object in use.

Sub-export IDs, on the other hand, are returned to the NAS client as part of the file handle, with the result that once a file handle is returned to a NAS client, the parent object never needs to be located again, since the sub-export ID is present in the file handle. Thus, the use of sub-export IDs as intermediaries between the inode and the corresponding policy allows a NAS Cache Operations to reliably determine any object's current policy, even when an arbitrary number of objects are discarded from the cache.

Inodes that are sub-export roots are located at node boot time by evaluating the path names configured for the sub-export roots, and marking the evaluated inodes as sub-export roots. Then, when an NCO Lookup, Create, Mkdir, Symlink or ReaddirPlus, returns a new file handle, it creates the new inode with a sub-export ID inherited from the new object's parent directory. Should some other operation need to create an inode for an object not present in the cache, the sub-export ID is determined by simply setting the ID to the sub-export ID present in the incoming file handle.

All of the NAS Cache Operations are described below in detail:

NCO File Create

The NCO File Create operation is performed with parameters that provide a parent directory file handle, a new file name and updated file attributes.

In order to determine policy to associate with the newly created file, the sub-export ID associated with the parent, if any, is propagated to the new or old child. The sub-export manager is then consulted to determine the policy object for the new object.

NCO File Delete

The NCO File Delete operation does not need to manage sub-export IDs.

NCO File Rename

As in NSO File Rename, the NCO File Rename operation is the equivalent of the removal of the target of the rename, if any, followed by the creation of a hard link from the source file to the target file, followed by the removal of a hard link from the source.

NCO File Truncate

There are no policy related changes required to the cache NCO module for file truncate operation.

NCO File Link

The NCO File Link operation adds a new name to an existing file. Since no new objects are created or looked-up by this operation, it requires no specific changes to manage sub-export IDs.

NCO File Read

The NSO File Read operation has no policy management related changes required, since the incoming sub-export ID determines the applicable policy with one lookup done by the Sub-export manager. However, the NCO File Read operation may read data from the back-end server and write that data to the local cache inode. Thus, in the case where the data being read is not present in the cache inode, the NCO File Read operation reads the desired data from the back-end server and writes it to the cache inode. Before doing this, the NCO File Read operation sets the inode's policy to the policy returned by the sub-export manager. Once the required policy has been set, eventually a cleaner will write that data to the appropriate type of persistent storage as dictated by the policy.

NCO File Write

The NCO File Write operation has no policy management related changes, but does need to determine the policy specified by the sub-export ID, in the same way that NCO File Read does.

Specifically, the sub-export ID in the file handle is used to initialize the field in the cache inode, if one is not already present in the NCO module already. Once the sub-export ID is available, the corresponding policy can be determined with a single call to the sub-export manager, and the resulting policy is placed in the inode. Eventually a cleaner will collect modified buffers from the memory cache and write these modified buffers to the appropriate type of persistent storage, as dictated by this policy.

Note that dirty buffers modified by this Write operation are transferred to the NVRAM card, shown in FIG. 2, where they remain until the buffer clean operation transfers the data to disk storage, at which point the NVRAM buffers can be freed.

Inode Attribute Manager 24

The inode attribute manager 24 is responsible for reading and writing attributes in files stored locally, either as part of a standard NAS file system 10 for use by the NSO, or as part of a cached file accessed by the NCO.

The cache table inode is a file that holds slotted pages full of inodes, as shown in FIG. 4. The Inode attribute manager 24 (IAM) provides several operations:

GetInodeByFH—This call locates an inode by file handle, and returns a referenced inode structure to its caller. It works by computing the hash value of the file handle, and then using the buffer package to load the block of the hash file that holds the head of that hash bucket. The operation then proceeds to iterate through the linked list of inodes, reading each inode in the list from the slotted page holding that inode's offset, until either a null next pointer is encountered, or until the inode with the desired file handle is located.

GetInodeByOffset—This call locates an inode by its offset in the inode file. The operation simply creates an inode object whose offset in the inode table is set to the input parameter specifying the inode offset.

MapInode—This call takes an inode returned by GetInodeByFH or GetInodeByOffset, and returns a referenced buffer to the buffer holding the block of the inode table inode that holds the inode in question.

Once an inode has been mapped, the caller can simply modify the inode returned by Mapinode and then release the buffer back to the buffer system, marking it as modified.

If the caller needs to just read the contents of the inode, it can do so after calling Mapinode as well. In this case, the buffer holding the inode table block is released without marking the underlying buffer as modified.

Directory Manager 26

The directory manager 26 implements a simple abstraction of tagged mappings between file names and file handles. Each mapping entry is tagged with a 64 bit identifier (sometimes called a cookie) used by NFS readdir operations as they iterate over the entries in a directory. The manager provides the following operations on directory inodes:

int32_t append(char *namep, uint8_t *fileHandle, uint32_t fileHandleLength, uint64_t cookie).

This call adds the name and file handle to the directory, replacing an existing entry if one exists. The cookie value is also stored. An error code is returned, or 0 for success.

int32 remove(char *namep)

This call removes the entry from the directory. It returns 0 for success, and otherwise a non-zero error code indicating the reason for failure, such as the entry's not existing.

int32_t readdir(uint64_t startCookie, char *space, uint32_t spaceSize, uint32_t *bytesReturnedp)

This call copies out an integral number of directory entries from the directory, starting at the entry starting at the tag value specified in startCookie. Each entry contains a 32 bit file name length, followed by that number of bytes of file name, followed by a 32 bit file handle length, followed by that number of file handle bytes, followed by a 64 bit integer giving the cookie tag of the next file name entry.

int32_t clear( )

This call empties out the contents of a directory. The resulting directory contains no entries.

Data Manager 28

The data manager 28 implements a normal user data file abstraction for use by the NSO and NCO modules, in terms of operations on the buffer module 22. It implements a read operation that takes an inode, an offset and a length, and returns a set of data buffers for inclusion in a network buffer. It also implements a write operation that takes an inode, an offset, a length, and a set of pointer; length pairs pointing at some data bytes, and copies the data into the buffers from the data bytes. In the read case, the inode's length is consulted to limit the read, and on a write operation, the inode's length is updated if the file is extended.

The operations provided in details are:

int32_t read(CfsInode *ip, uint64_t offset, uint32_t length, uint32_t bufCount, BufHandle *outBufspp)

This call reads data from the inode specified by ip, at the offset specified by the offset parameter, for the number of bytes specified by the length parameter. A number of read referenced buffers, one for every block's worth of data, aligned to an integral block boundary, are returned in *outBufspp.

The CfsInode structure simply stores the offset of the desired inode within the inode file. The underlying inode is located by calling the buffer package to read the appropriate containing block of the inode file.

int32_t write(CfsInode *ip, uint64_t offset, uint32_t length, uint32_t iovCount, IovEntry *iovsp)

This call writes data from the data portion of one or more network buffers, whose data portion is described by the concatenation of a set of IovEntry structures. Each IovEntry consists of a pointer and a length, and describes a simple array of bytes to be written to the file. Furthermore, if the value of (length+offset) is greater than the length attribute in the underlying inode, the inode's length is set to the new value of (length+offset).

int32_t setLength(CfsInode *ip, uint64_4 newLength).

This call changes the length of the file specified by the parameter ip. The buffer holding the inode is updated, and if the length is being reduced, any data blocks allocated to the inode are freed by calling the truncate function in the inode space truncator 38, described below.

Inode Object Allocator 30

The inode object allocator 30 is responsible for allocating and freeing inodes as files and directories are created and deleted. Inodes are managed by maintaining a free inode list in a header in the inode file (stored where there inode at offset 0 would be). If the inode free list is empty, a new block of file space is allocated to the inode file, and the newly available inodes are added to the free list.

Freeing an inode is simple: the inode is simply added to the inode free list.

<<simple picture of a file containing an array of inodes, including a header where inode at offset 0 would be>>

Inode Space Allocator 36

The inode space allocator 36 is responsible for adding blocks to an already created inode. An inode stores pointers to a set of disk blocks, in an indirect block tree similar to that used by FreeBSD and other BSD-based Unix systems.

In order to handle multiple types of storage, however, the inode space allocator 36 needs to be extended to choose blocks from the desired type of storage.

As described above, each inode is associated with a policy having an allocType method that maps offsets within an inode into a particular type of storage. When the buffer cleaner module needs to write out the dirty buffers associated with the inode, it queries the inode's policy object to determine which type of storage is required for each block. The inode space allocator 36 then calls the block allocator 42 to allocate the required number of blocks of each type of storage, and then schedules the writes from the memory buffers to the newly allocated blocks. Finally, once the writes complete, any overwritten blocks are freed back to their respective typed storage pools via the block allocator 42 module.

Inode Space Truncator 38

The inode space truncator 38 is responsible for freeing blocks when a file's size is reduced, freeing the disk blocks allocated past the new end-of-file (EOF). This module is essentially unmodified in this invention, since it simply frees the blocks pointed to by the indirect block trees in the inode.

The block allocator 42 module knows which type of storage pool is associated with each block, and ensures that each block is freed back to the appropriate storage pool.

Block Allocator 42

The block allocator 42 is responsible for allocating a range of blocks of a particular type. A typical aggregate has two or three different types of persistent storage from which blocks of storage can be allocated. Each type of persistent storage is addressed by blocks numbers, and blocks are divided into segments whose default size is 2^16 blocks (although power of 2 multiple of the block size is an acceptable segment size for an aggregate). Blocks from different persistent stores are mapped in groups of an entire segment into the aggregate address space, so that it is guaranteed that within a particular segment, all of the blocks share the same type of persistent storage, but two different adjacent segments may differ in their underlying type of persistent storage.

Buffer Fill/Clean Module 40

Buffer Fill

A buffer fill operation is invoked when a buffer is accessed that is not marked as valid. The buffer manager reads the data from SSD or HDD, as determined by the block address, and then the buffer is marked as valid, and those threads waiting for the data to become valid are woken.

Buffer Clean

A buffer clean operation is invoked when the number of dirty pages in the buffer cache exceeds a minimum threshold, designed to ensure that there are sufficient numbers of dirty pages to clean efficiently.

Once this minimum threshold has been crossed, cleaner threads are created in the buffer fill/clean module 40 that collect a number of dirty buffers that belong to one or more inodes, ensure that the respective blocks are allocated for the dirty buffers by calling the inode space allocator 36 (which itself calls the block allocator 42 to allocate new blocks and to free old, overwritten blocks). The cleaner threads then calls the SSD and HDD drivers to actually perform a small number of large writes to actually clean the dirty buffers.

Driver Modules

A buffer system above the drivers provides a memory cache tagged by inode and offset within the inode. Most inodes represent files in the file system 10, but a few inodes represent physical disk or SSD drives 48. Both are cached using the buffer cache system 10.

<<describe buffer cache operation, including reference counts, filling flag, dirty flag, cleaning flag>>

<<describe remaining objects>>

At the lowest level, there are drivers that provide access to an arbitrary set of rotating disk drives and solid state disk drives, although other types of persistent storage providing an abstraction of an array of disk blocks may also be provided to the buffer system 10.

NSO Policy Associations

In the basic invention, each separate file system 10 has its own file system 10 identifier, based upon which the default policy specification can be easily chosen, and for those file systems for which no default policy has been specified, a global policy specification can be used.

The most interesting part of the problem of associating policies with sets of files arises when putting a policy on a specific directory and its descendents. In this invention, a file named .avere_control is placed can be placed in any directory, with this file holding the storage policy to be applied to all files in the .avere_control's containing directory, and all of that directory's descendents. In order to reliably associate a policy object with an arbitrary inode, the invention must first be able to detect when an .avere_control policy file is present in a directory.

This is straightforwardly done by adding several fields to each inode. There are added:

- a policy file inode number, giving the inode number of the .avere_control policy file in effect for this object;
- a "policy root" bit indicating that the policy file specified by the policy file inode number is stored in this directory;
- a policy version number, incremented as described below to detect the insertion and deletion of other .avere_control policy files during operation of the system 10;
- a parent inode number, specifying the inode of the directory containing a file; if a file contains more than one hard link to the file, the file contains a pointer to a linked list of blocks storing the back pointers to the parent directories in question.

When a file, directory or symlink is created, the file system 10 sets its original parent inode number to the directory in which the object is created. This field is also updated on a cross-directory rename operation. A hard link operation adds an additional back pointer to those stored for a particular file, and may involve adding an additional block of back pointers if the current representation for the back pointers is at its capacity limit. Similarly, an unlink operation will remove a back pointer from the set of back pointers, possibly releasing empty blocks of back pointer information. Directory back pointers do not have to use this mechanism, as " . . . " entries exist in all directories, pointing back to the single parent directory that the child directory has. This parent information will be used for locating policy information in certain cases.

When an inode is loaded into memory, a pointer is set up to the corresponding parsed policy, which is found by searching an in-memory hash table; if the policy object is not present in the hash table, it is read from the appropriate policy file inode and entered into the hash table at this time. Once the policy object has been located, the policy version in the policy object is compared with the policy version number in the referencing inode. If the versions do not match, the policy path walk process, described below, is performed, to locate the correct policy object for the referencing inode, and a reference to that policy object is stored in the in-memory inode object.

Special care must be taken when adding or removing a policy file. When a new policy file is updated or created, then before inserting the new policy object reference into the inode, the system 10 first walks up the directory tree, starting at the directory into which the policy file is being inserted, and continuing by following each directory's " . . . " parent pointer in turn, until either the root of the file system 10 is encountered, or until an existing policy file is encountered. The existing policy object's version number is incremented at this time, which will force the performance of the policy path walk process described below to determine the new correct policy object for all descendents of that policy object.

Similarly, when a policy file is deleted from a directory, the policy inode's policy version number is also incremented, so that any files connected to that policy object will re-compute, via the policy path walk process, the new correct policy object to use.

The policy path walk process is used to find the correct policy to use in the name space hierarchy, and is used when the structure of the policy name space changes, either because of a directory rename to a new location, or because of the insertion or deletion of a relevant policy object (.avere_control file). The process begins when a data cleaning, or other operation, needs to determine the policy object for use with a given file. If the inode being accessed has a policy version number matching the policy version of the policy object itself, then the already parsed object can be used. If the policy object associated with the file or directory has the policy root bit set, this means that the policy file is actually present in this directory, and the policy object based on the policy file, and associated the newly parsed policy object with the directory in question will simply need to be rebuilt. Otherwise, the policy path walk procedure recursively applies itself to the parent object of the file or directory in question, effectively walking up the file system 10 tree until it encounters a policy object whose version matches the policy version in the inode itself, at which point a reference to this policy object is inserted in the file's inode.

Figure 5:
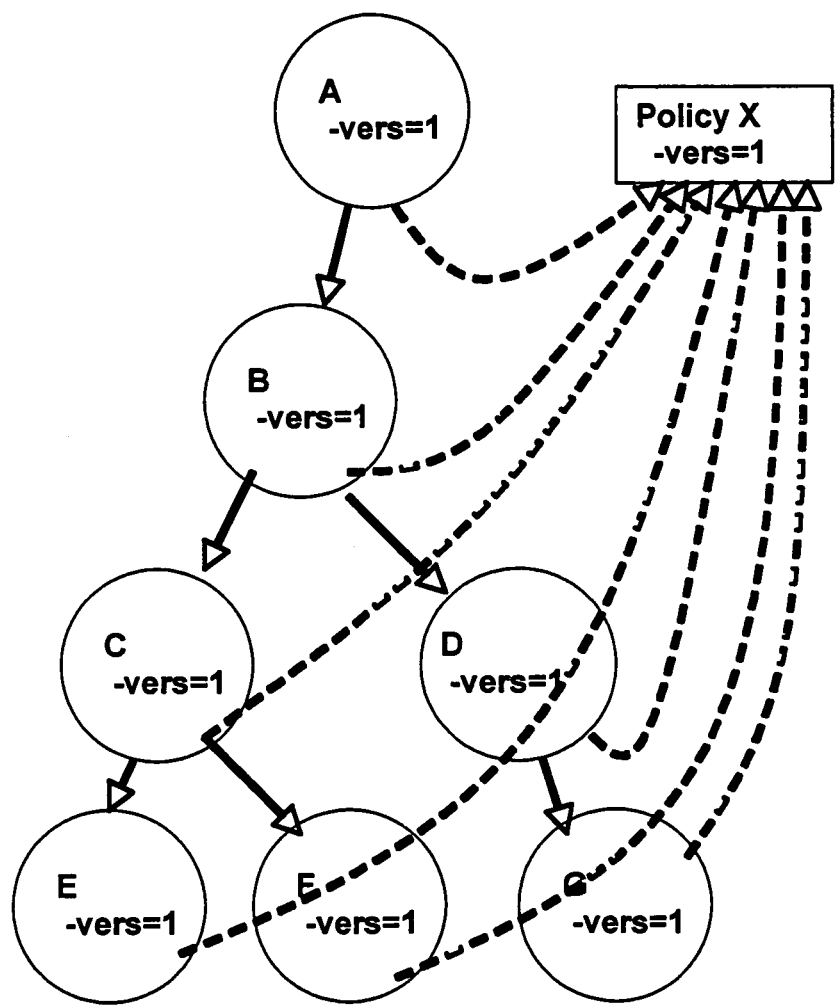
FIG. 5 shows a tree of directories and files, each of which has a reference to a policy object file.

In FIG. 5, a tree of directories (A, B, C and D) and files (E, F and G) is shown, each of which has a reference to a policy object file, shown as the rectangular box. Each directory or regular file has the same path version (1), which matches the policy object's version (also 1). Thus, this is a representation of the state of the file system 10 where directory A has a policy object X, and all of its descendent files and directories B-G share the same policy object.

Figure 6:
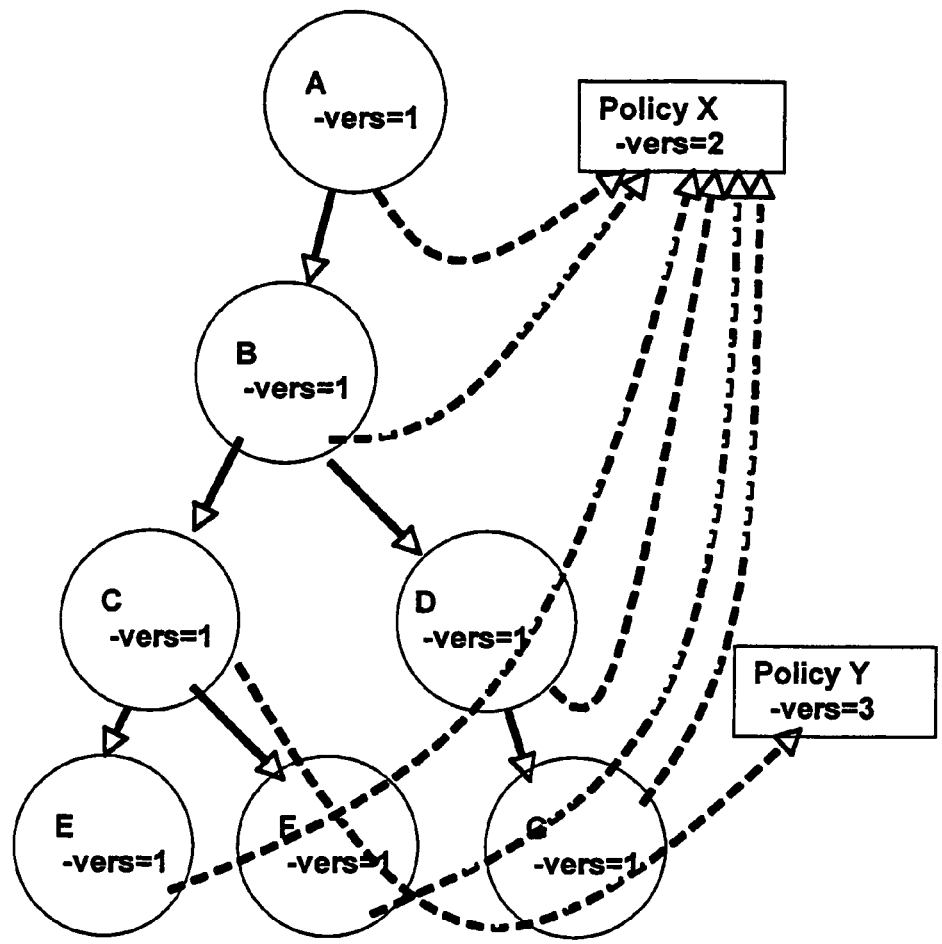
FIG. 6 shows a new policy object Y added to a directory C.

If a new policy object Y is added to the directory C, the picture looks like as shown in FIG. 6.

In FIG. 6, a new policy object, Y, is created and associate this object with directory C. Before linking Y into directory C, the policy creation operation walks up the tree to the next highest director having a policy object (directory A), and then increments the associated policy object's version from 1 to 2. The goal is to ensure that any references to an old inode, such as D, will detect that the policy inherited from its ancestor need to be revalidated on the next reference to the object. There are a number of files and directories that are now pointing to the wrong policy, but in all of these cases ( ) the policy version number in the inode no longer matches the version number in the policy object, so the link will not be used. In this case, it can be seen that a new policy Y has been created for directory C, and spliced into the tree as C's policy object, and the path versions for both X and Y have been set to new values. The next access to any of the file system 10 objects will then walk up the tree to locate the current policy to use.

Figure 7:
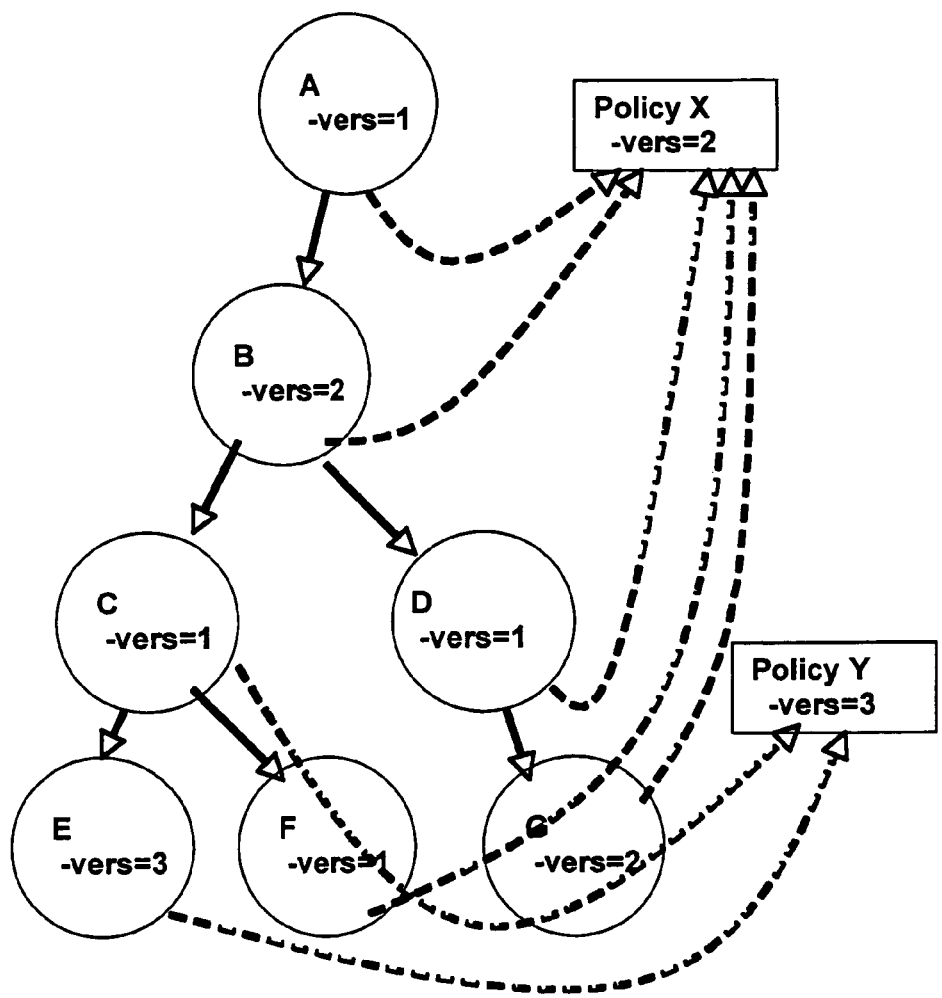
FIG. 7 shows a state of a directory and files with a fixed policy link.

Assume there are accesses to directory B, file E and file G. Each access would notice that the policy link is incorrect, and would perform the policy path walk procedure, fixing up the policy link. The resulting state would look like the description of FIG. 7.

Note that the walks up from B and G locate the same policy object (X), but update the path policy version to 2 for those inodes. The walk up from inode E encounters the policy object Y at node C, and links to that policy, setting inode E's path policy version to match Y's version (3) at the same time.

NCO Policy Associations

The above describes how to associate policies with arbitrary subsets of a file system 10 name space, but assumes that the system 10 can store and maintain a set of back pointers from each file or directory in the system 10. In some distributed implementations of a NAS cache, this requires that learned parent/child relationships between file objects be passed relatively expensively between nodes, since many NAS protocols, including NFS version 3, do not provide operations for determining the parent directories from a normal file's file handle.

Thus, this invention provides a second mechanism for associating policies with files and directories within a name space, this one primarily to be used in systems utilizing a NAS cache operations module 34, although the same technique works for NAS Server Operations as well, at the cost of slightly larger file handles. The goal will be to ensure that every incoming file handle will include a 16 bit field called a sub-export tag, along with the usual information required to determine the back-end file server's file handle. Each sub-export tag will be associated with a policy object described above on policy specifications, with the policy specification stored in an .avere_control file.

To enable this mechanism, a predefined collection of directories are created by the Inode object allocator 30 as directed by an external management process; these directories are called sub-export roots. Each sub-export root is assigned a unique 16 bit sub-export tag. The root directory for the file system's true NFS export is always a sub-export root. Whenever a file handle is returned from an NCO operation, including NFS create, NFS lookup, NFS mkdir, NFS symlink, or NFS readdirplus, the parent's sub-export tag is included in the returned child's file handle, unless the child object is a sub-export root directory, in which case the sub-export root's sub-export tag is included instead. Similarly, when the mount protocol mounts the root directory for the file system 10, it is augmented to include the export's root directory's sub-export tag to the returned file handle, as well.

A sub-export policy manager 44 monitors the contents of the .avere_control files, if any, present in the corresponding sub-export root directories. Thus, whenever an .avere_control file stored in a sub-export root directory is modified, such as by an NFS write, NFS create or NFS delete operation, the sub-export policy manager 44 re-reads the .avere_control file and updates the policy associated with the sub-export's root's sub-export tag.

Thus, every incoming file handle is tagged by a sub-export tag that can be mapped to a policy specification by calling the sub-export manager with the incoming file handle's sub-export tag, and obtaining the sub-export's currently active policy.

When the inode space allocator 36 needs to allocate space to a particular inode, the policy associated with the inode's sub-export tag is used to determine the type of storage from which space should be allocated to the inode, as described earlier.

Example

The following describes a write operation where an implicit or explicit policy directs the data to be located on one or more types of storage.

An example is provided where the file "/a/b" is opened in write mode, and then 10 MB of data is written to it. In this example, the directory B is marked as a policy root, and has a management-assigned sub-export tag, with an associated policy that specifies that the first 1 MB of storage should be allocated from SSD storage, and the remaining bytes in the file should be allocated from normal HDD-resident storage.

The file open operation turns into two NSO lookup operations, one looking up the directory "a" in the root directory to determine the file handle of the directory "a", and the next one looking up the name "b" in "a". The lookup of "a" in the directory "/" retrieves the file handle for "a", consults a cache of the management database 20, determines that "a" is a policy root, and augments the file handle with a tag indicating the policy to be applied to files under directory "a" in the name space. When the NSO lookup for "b" in directory "a" is received, the policy tag on "a"s file handle is propagated to "b"s file handle as well.

The client then sends 10 MB of NSO write operations (if, as is common, each NSO write operation contained 64 KB of data, this would be 160 separate write calls). This data is commonly written directly to memory, where it remains until the Buf Clean mechanism collects the modified data to write to persistent storage. The Buf Clean module determines which sections of the file have new data, and calls the Inode space allocator 36 to ensure that blocks have been allocated for the appropriate block range in the file. In this example, the Buf Clean module will request that the first 640 blocks of the file "b" are allocated. The Inode space allocator 36 examines the policy associated with file "b" (the policy inherited from directory "a"s file handle) and determines that the first 64 blocks should be allocated from SSD-backed segments, and the remaining 576 blocks should be allocated from HDD-backed segments. The Inode space allocator 36 then calls the Block allocator 42 module to actually obtain the storage of the appropriate type, and then inserts these block addresses into the indirect block tree associated with file "b".

Once the appropriate blocks have been allocated from the desired types of persistent storage, and these blocks have been added to file "b"s indirect block tree, the system 10 schedules the real IO operations. Specifically, the Buf Clean module starts IO operations from the buffers in memory being cleaned to the newly allocated persistent storage blocks just allocated. Once these IO operations complete, the buffers are marked as cleaned, and the Buf Clean operation terminates.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. A system for storing file data and directory data received over a network comprising:

a network interface in communication with the network which receives Network Attached Storage (NAS) requests containing data to be written to files from the network and a set of server exports, each of which is a root of a file system tree;

a first type of storage which is a solid state drive;

a second type of storage different from the first type of storage, where the difference includes drives that operate at least at a 10% difference in speed or drives that have at least a 10% difference in bandwidth or a 10% difference in average latency perform random read operations, the second type of storage is a rotating magnetic drive;

a policy specification specifies a set of data policy rules associated with each server export such that the policy rules are applied to any object allocated within a file system tree associated with an export, and which specifies a first portion of one or more files' data which is less than alt of the files' data is stored in the first type of storage and a second portion of the data which is less than all of the data of the files and is different from the first portion is stored in the second type of storage, the policy specification either associated with an inode and inherited from its parent directory upon the inode's creation, or alternatively stored in an incoming file handle and inherited from its parent directory by lookup, create or other operations that return new file handles, with a policy ID field stored in each inode and inherited on file or directory creation; and a hardware processing unit which executes the policy and causes the first portion to be stored in the first type of storage and the second portion to be stored in the second type of storage, the processing unit connected to the first type of storage and the second type of storage by internal buses, the first portion of data is smaller than the second portion of data so by the time the processing unit is processing the first portion of data, the rotating magnetic drive of the second type of storage is transferring the second portion of data at the rotating magnetic drive's full rate after having performed the rotating magnetic drive's high latency seek operation concurrent with the transfer of at least a portion of the first portion of data from the solid-state drive of the first type of storage.

2. The system as described in claim 1 where the policy specification is stored in a file within the first type of storage or the second type of storage.

3. The system as described in claim 1 including a management database outside of the first type of storage or the second type of storage where the policy specification is stored in the management database.

4. The system as described in claim 1 wherein the policy specification specifies the first portion and the second portion of one or more files' data, where either portion may include file system meta-data.

5. The system as described in claim 4 wherein the policy specification for the first portion or the second portion of one or more files' data specifies meta-data containing block addressing information.

6. The system as described in claim 1 including a buffer module having buffers and which reads and writes data into the buffers.

7. The system as described in claim 6 including an inode attribute manager which updates attributes in an inode.

8. The system as described in claim 7 including a directory manager which treats a directory object as a set of mappings between file names and inode identifiers.

9. The system as described in claim 7 including a data manager which copies data to and from the buffers.

10. The system as described in claim 9 including an inode object allocator which allocates inodes and tags them with policy specifications.

11. The system as described in claim 10 including a NAS server operations module which receives incoming NAS requests and invokes local storage operations interfacing with the inode attribute manager, the directory manager, the data manager and the inode object allocator for reading and writing file and directory attributes, reading and writing file data, and performing directory operations.

12. The system as described in claim 10 including a NAS cache operations module which acts as a cache of data storage in one or external Network File System (NFS) servers and which creates and maintains cached versions of actively accessed directories and files stored at the external NFS server.

13. The system as described in claim 1 wherein at least two files are stored within a directory, where a Block Allocator allocates some blocks to a first file in the directory from a first type of storage, and allocates some blocks to a second file in the directory from a second type of storage different from the first type of storage.

14. The system as described in claim 13 including a Block Allocator that allocates blocks for a file from a first type of storage and additional blocks for the same file from a second type of storage different from the first type of storage.

15. The system as described in claim 14 where the Block Allocator determines the blocks to be allocated to a file from a first type of storage, and the blocks to be allocated from a second type of storage different from the first type of storage, based upon the policy associated with the file.

16. A method for storing file data and directory data received over a network comprising the steps of:
receiving Network Attached Storage (NAS) requests containing data to be written to files from the network at a network interface and a set of server exports, each of which is a root of a file system tree;
executing with a hardware processing unit a policy specification which specifies a set of data policy rules associated with each server export such that the policy rules are applied to any object allocated within a file system tree associated with an export, and which specifies a first portion of one or more files' data which is less than all of the files' data is stored in a first type of storage which is a solid state drive and a second portion of the data different from the first portion which is less than all of the data of the files stored in the second type of which is different from the first type of storage where the difference includes drives that operate at least at a 10% difference in speed or drives that have at least a 10% difference in bandwidth or a 10% difference in average latency perform random read operations, the second type of storage is a rotating magnetic drive, the policy specification either associated with an inode and inherited from its parent directory upon the inode's creation, or alternatively stored in an incoming file handle and inherited from its parent directory by lookup, create or other operations that return new file handles, with a policy ID field stored in each inode and inherited on file or directory creation; and
causing with the processing unit the first portion to be stored in the first type of storage and the second portion to be stored in the second type of storage, the processing unit connected to the first type of storage and the second type of storage by internal buses, the first portion of data is smaller than the second portion of data so by the time the processing unit is processing the first portion of data, the rotating magnetic drive of the second type of storage is transferring the second portion of data at the rotating magnetic drive's full rate after having performed the rotating magnetic drive's high latency seek operation concurrent with the transfer of at least a portion of the first portion of data from the solid-state drive of the first type of storage.

17. The method as described in claim 16 including the step of writing data to a file located in a directory which is a policy root directory and has an associated policy specification.

18. The method as described in claim 17 including the steps of looking up a subdirectory D, which is a policy root directory having an associated policy specification, and associating the policy specification with subdirectory D.

19. The method as described in claim 18 including the step of looking up a subdirectory D of a parent directory having an associated policy specification, and associating the parent directory's policy specification with subdirectory D.

20. The method as described in claim 19 including the step of looking up a file within a directory having an associated policy specification, and associating the directory's policy specification with file F.

21. The method as described in claim 20 including the step of writing data to a file F located in a directory having an associated policy specification, and the step of the Inode Space Allocator allocating space to hold the written data according to the associated policy specification.

22. The method as described in claim 18 wherein the looking up directory D step includes the steps of consulting a cache of a management database, determining that the directory D is a policy root, and augmenting directory D's file handle with a policy tag indicating a policy to be applied to files under directory D in the file system's namespace.

23. The method as described in claim 22 including the step of looking up a subdirectory D of a parent directory having an associated policy specification, and associating the parent directory's policy specification with subdirectory D.

24. The method as described in claim 23 including the step of looking up a file within a directory having an associated policy specification, and associating the directory's policy specification with file F.

25. The method as described in claim 24 including the steps of receiving the lookup for file F within directory D, and propagating the policy tag from directory D's file handle to file F's file handle.

26. The method as described in claim 25 including the step of storing the data in buffers of a memory until a buf clean module collects modified data to write the modified data to persistent storage; determining with the buf clean module which portions of the tile F have new data; and calling from the buf clean module into an inode space allocator to ensure that blocks have been allocated in persistent storage for an appropriate block range in the file F.

27. The method as described in claim 26 including the step of identifying with the inode space allocator a policy associated with the file F from the policy tag of file F's file handle; calling a block allocator module with the inode space allocator; obtaining with the block allocator module storage blocks of an appropriate type in persistent storage; and inserting with the inode space allocator block addresses associated with the appropriate storage into an indirect block tree associated with a file F.

28. The method as described in claim 27 including the step of starting Input/Output (IO) operations with the buf clean module from buffers in memory having respective data written to the appropriate storage blocks in persistent storage.

29. A system for storing file data and directory data received over a network comprising:
a network interface in communication with the network which receives Network Attached Storage (NAS) requests from the network, including the NAS requests containing data to be written to files and a set of server exports, each of which is a root of a file system tree;
a first type of storage which is a solid state drive;
a second type of storage different from the first type of storage where the difference includes drives that operate at least at a 10% difference in speed or drives that have at least a 10% difference in bandwidth or a 10% difference in average latency perform random read operations, the second type of storage, is a rotating magnetic drive;
a policy specification which specifies a set of data policy rules associated with each server export such that the policy rules are applied to any object allocated within a file system tree associated with an export, and which specifies a first portion of one or more directories' data which is less than all of the directories' data is stored in the first type of storage and a second portion of the data different from the first portion which is less than all of the data of the directories is stored in the second type of store, the policy specification either associated with an inode and inherited from its parent directory upon the inode's creation, or alternatively stored in an incoming file handle and inherited from its parent directory by lookup, create or other operations that return new file handles, with a policy ID field stored in each inode and inherited on file or directory creation; and
a hardware processing unit which executes the policy and causes the first portion to be stored in the first type of storage and a second portion to be stored in the second type of storage, the processing unit connected to the first type of storage and the second type of storage by internal buses, the first portion of data is smaller than the second portion of data so by the time the processing unit is processing the first portion of data, the rotating magnetic drive of the second type of storage is transferring the second portion of data at the rotating magnetic drive's full rate after having performed the rotating magnetic drive's high latency seek operation concurrent with the transfer of at least a portion of the first portion of data from the solid-state drive of the first type of storage.

30. A system as described in claim 1 wherein the first and second types of storage organized as an aggregate, providing an array of persistent storage blocks of different types of storage.

31. A system for storing file data and directory data received over a network comprising:
a network interface in communication with the network which receives Network Attached Storage (NAS) requests containing data to be written to files from the network and a set of server exports, each of which is a root of a file system tree;
a first type of storage which is a solid state drive;
a second type of storage different from the first type of storage where the difference includes drives that operate at least at a 10% difference in speed or drives that have at least a 10% difference in bandwidth or a 10% difference in average latency perform random read operations, the second type of storage is a rotating magnetic drive;
a policy specification specifies a set of data policy rules associated with each server export such that the policy rules are applied to any object allocated within a file system tree associated with an export, and which specifies a first portion of one or more files' data which is less than all of the files' data is stored in the first type of storage and a second portion of the data different from the first portion which is less than all of the data of the files is stored in the second type of store, the policy specification either associated with an inode and inherited from its parent directory upon the inode's creation, or alternatively stored in an incoming file handle and inherited from its parent directory by lookup, create or other operations that return new file handles; and
a hardware processing unit which executes the policy and causes the first portion to be stored in the first type of storage and a second portion to be stored in the second type of storage, the processing unit connected to the first type of storage and the second type of storage by internal buses, the first and second types of storage organized as an aggregate, providing an array of persistent storage blocks of different types of storage, the first portion of data is smaller than the second portion of data so by the time the processing unit is processing the first portion of data, the rotating magnetic drive of the second type of storage is transferring the second portion of data at the rotating magnetic drive's full rate after having performed the rotating magnetic drive's high latency seek operation concurrent with the transfer of at least a portion of the first portion of data from the solid-state drive of the first type of storage.

32. A system for storing file data and directory data received over a network comprising:
a network interface in communication with the network which receives Network Attached Storage (NAS) requests containing data to be written to files from the network and a set of server exports, each of which is a root of a file system tree;
a first type of storage which is a solid state drive;
a second type of storage different from the first type of storage where the difference includes drives that operate at least at a 10% difference in speed or drives that have at least a 10% difference in bandwidth or a 10% difference in average latency perform random read operations, the second type of storage is a rotating magnetic drive;
a policy specification specifies a set of data policy rules associated with each server export such that the policy rules are applied to any object allocated within a file system tree associated with an export, and which specifies a first portion of one or more files' data which is less than all of the files' data is stored in the first type of storage and a second portion of the data different from the first portion which is less than all of the data of the files is stored in the second type of store, the policy specification either associated with an inode and inherited from its parent directory upon the inode's creation, or alternatively stored in an incoming file handle and inherited from its parent directory by lookup, create or other operations that return new file handles, with a policy ID field stored in each inode and inherited on file or directory creation; and
a hardware processing unit which executes the policy and causes the first portion to be stored in the first type of storage and a second portion to be stored in the second type of storage the first portion of data is smaller than the second portion of data so by the time the processing unit is processing the first portion of data, the rotating magnetic drive of the second type of storage is transferring the second portion of data at the rotating magnetic drive's full rate after having performed the rotating magnetic drive's high latency seek operation concurrent with the transfer of at least a portion of the first portion of data from the solid-state drive of the first type of storage.

* * * * *